United States Patent Office 3,714,064
Patented Jan. 30, 1973

3,714,064
PRODUCTION OF SMALL PARTICLE SIZE
AQUEOUS COLLOIDAL SILICA SOLS
Peter H. Vossos, Lisle, Ill., assignor to Nalco
Chemical Company, Chicago, Ill.
No Drawing. Continuation-in-part of applications Ser. No. 664,310, Aug. 30, 1967, and Ser. No. 744,285, June 12, 1968, both now abandoned. This application Apr. 22, 1971, Ser. No. 136,586
Int. Cl. B01j 13/00; C01b 33/14
U.S. Cl. 252—313 S                 2 Claims

ABSTRACT OF THE DISCLOSURE

The invention is directed to aqueous colloidal silica sols which are concentrated, yet are in the form of extremely finely divided, discrete, dense particles whose average particle size is less than 5 millimicrons. Typical sols produced in accordance with the invention have the following characteristics:

Average particle size
 diameter _____ 2 but less than 5 m$\mu$.
Percent silica, as $SiO_2$_____ 10 to 25%.
pH_____ 9 to 11.
$SiO_2/Na_2O$_____ >15.

The invention also is directed to a method of producing such sols wherein an acidic aqueous colloidal silica sol having an $SiO_2$ concentration of 5–10% by weight and a particle size diameter of less than 5 millimicrons is alkalized, a portion of the resulting alkaline sol is heated under evaporation conditions to a temperature not greater than 150° F., evaporation is maintained at constant volume by adding unheated alkaline sol, and said evaporation is continued until the silica concentration is within the range of 10–25% by weight.

---

This invention is a continuation in part of my earlier filed invention, Ser. No. 664,310, filed Aug. 30, 1967, now abandoned; and my copending application Ser. No., 744,-285, filed June 12, 1968, now abandoned.

INTRODUCTION

A useful species of silica sol product is an aqueous colloidal silica sol whose particles are in an extremely fine state of subdivision. Such sols are usually water white and are valuable as anti-soiling agents for the treatment of a variety of natural and synthetic fibers.

One of the various uses for small particle diameter colloidal silica sols lies in the treatment of rugs to prevent soiling. This treatment depends upon the fact that particles of colloidal silica can be deposited upon the fibers without undue whitening whereby it is possible to remove soil very readily by vacuuming. The larger the particles of colloidal silica, the greater is the tendency for the deposit to reflect light in the form of a whitening of the fibers. This is undesirable, since it detracts from the color of the rugs. There are many other uses where silica is deposited in extremely thin layers on substrates, where whitening must be avoided. This behavior has limited the amount of silica which can be deposited from sols of conventional types.

The water white silica sols of this invention are also valuable textile treating agents to prevent soil redeposition in fabrics which have been rendered wrinkle-resistant by treatment with certain organic resinous chemicals.

Until the present invention, it has been impossible to simply produce extremely small particle size aqueous colloidal silica sols at concentrations whereby they are attractive commercially. With the exception of laboratory experimental work, no simple process has been described in the literature for preparing extremely small particle size silica sols having silica concentrations much in excess of 5 to 8% by weight whose particle size is below 5 millimicrons. Such silica sols, even when produced on a laboratory basis, are curiosities. At these concentrations, they are impractical from a commercial standpoint since such large volumes of water must be shipped with the silica.

It would be a valuable contribution to the art if extremely small particle size silica sols could be made in a relatively concentrated form and which were stable over long periods of time. Of further value would be a process of making aqueous colloidal silica sols which have the silica in an extremely fine state of subdivision and which would produce a concentrated product of water white appearance.

OBJECTS OF THE INVENTION

Based on the above, it therefore becomes an object of the invention to provide new and novel concentrated small particle size aqueous colloidal silica sols.

Another object of the invention is to provide a method of making concentrated small particle size silica sols.

Other objects will appear hereinafter.

THE INVENTION

As indicated, the invention provides to the art new, improved aqueous colloidal silica sols composed of discrete, dense particles of silica which have the following characteristics:

Average particle size
 diameter _____ 2 but less than 5 m$\mu$.
Percent silica, as $SiO_2$ _____ 10 to 25%.
pH_____ 9 to 11.
$SiO_2/Na_2O$ _____ >15.

In the preferred sols of the invention, the average particle size diameter ranges to between 3 to 4.5, and even more preferably, between 2.5 and 4.0. The percent silica in the sols may be conveniently concentrated to produce silica concentrations within the range of 15 to 25% by weight silica, expressed as $SiO_2$.

The sols, as indicated, have a $SiO_2/Na_2O$ ratio of greater than 15. This ratio is preferably within the range of 16 to 35 although it may be within the range of 30 to 45. The smaller amounts of sodium although usable, tend to produce sols whose viscosities are not entirely satisfactory from a storage or shipping standpoint.

The pH's of the finished sols range between 9 and 11, although in most instances, as produced at the silica concentration indicated above, are usually within the range of 9.5 to 10.5 which renders them sufficiently non-alkaline to make them convenient from a handling and personnel safety standpoint.

Another characteristic of the finished sols is that they have an electrical conductivity greater than 3,000 micromhos with laboratory evidence indicating that the typical conductivity of sols produced by the invention have conductivities within the range of 4,000 to 6,000 micromhos with the conductivity being proportional to the silica $SiO_2/Na_2O$ ratio and the silica concentration of the finished sol. Also, the surface area of the finished sols is greater than 600 square meters per gram.

The sols of the invention as produced are water white, relatively non-viscous and have storage stability at room temperature in excess of 6 months. Prior art silica sols of particle size ranges within the ranges herein specified and at the concentrations achieved by this invention are characterized as being extremely viscous materials which have shelf lives of only a few days to but a few weeks at best.

The sols of the invention are produced by treating an acidic aqueous colloidal silica sol which has an $SiO_2$ concentration of from 5 to 10% by weight with a water-soluble alkali metal or ammonium base to furnish an $SiO_2/Na_2O$ ratio of at least 15 whereby an alkaline sol is provided. The ratio is preferably within the range of 16 to 35 although it may be within the range 20 to 45. The particle size of the starting acidic aqueous colloidal silica sol must be less than 5 millimicrons and preferably is within the range of 1 to 2 millimicrons.

The alkaline sol produced above is then concentrated by direct evaporation until a silica concentration within the range of 10 to 25% by weight is produced The novelty of the process lies in the fact that the concentration step just described is conducted at a temperature not greater than 150° F. and preferably is conducted at a temperature within the range of 80 to 120° F.

There are two methods of treating and preparing the silica sols taught by this invention.

In one method, the alkaline sol is evaporated by heating, while continuously adding thereto additional alkaline sol at a rate sufficient to maintain a constant evaporation rate such that the initial heel volume remains constant. This will hereinafter be referred to as the constant volume evaporation method. In the prior art, there are methods of constant volume evaporation such as disclosed in U.S. Pat. 2,833,724. The main disadvantage of this patent is that the temperature of the feed sol and the temperature of the heel have to be closely equated otherwise the silica particles would grow to a substantial degree. This invention has overcome the disadvantage by the use of a very low temperature for evaporation. By the practice of this invention, there is no need to maintain the same temperature for the feed sol and the heel.

In the other method, an alkaline sol having an $SiO_2/Na_2O$ ratio of at least 7.5, preferably within the range of from 15 to 25 and even more preferably from 10 to 17.5, is evaporated by heating while continuously adding thereto a small portion of an acidic colloidal silica sol at a rate sufficient to maintain a constant evaporation rate such that the initial heel volume remains constant. This method will be hereinafter referred to as the acidic sol addition method. As in the constant volume there is no need to preheat the feed sol to the same temperature as the heel sol. The difference between these two methods is that in the acidic sol addition method an acidic sol is used as the feed sol. Constant volume is maintained until the silica concentration has been reached. Once this silica concentration has been reached, the $SiO_2/Na_2O$ ratio should have been decreased to a value in excess of 15 and preferably within the range of 16 to 25. Both the alkaline sol and the acidic sol have a particle size range less than $5\mu$.

A convenient source of starting acidic colloidal silica sol from which the sols of this invention are conveniently produced are those described in Bird U.S. Pat. 2,244,325. The disclosure of this patent is incorporated herein by reference. The process described by this patent comprises contacting a dilute solution of an alkali metal silicate with a hydrogen form cation exchange resin whereby an acidic colloidal silica sol is produced. The concentration of the starting silicate solution may be varied over a fairly broad range, so as to provide a finished effluent acidic sol which contains between 5 to 10% weight silica expressed as $SiO_2$. Such a silicate solution may be rapidly passed through the cation exchange resin to produce acidic sols having approximately the silica concentration of the starting silicate solution.

When silicate solutions of the concentration just specified are passed in contact with the hydrogen form cation exchange resin, particularly a sulfonated copolymer of styrene and divinyl benezene, which has been placed in the hydrogen form by treatment with a mineral acid such as sulfuric acid, care must be taken to prevent gelation of the silicate solution in contact with the bed. To achieve conversion into a silica sol, it is desirable that the flow rates be rapid. Alternatively, the ion exchange process for converting the silicate solutions into silica sols may be conducted at reduced temperatures. Below is an illusrative example showing the use of low temperatures to produce the starting acidic sols:

Example I

An aqueous solution of sodium silicate was prepared from commercial sodium silicate having a specific gravity of 1.4, and which contained approximately 28% $SiO_2$. This silicate had an $Na_2O:SiO_2$ ratio of 1:3.25. The solution was diluted with deionized water to produce a feed silicate solution containing 10% $SiO_2$ and 3.1% $Na_2O$.

A stronge acid cation exchange resin bed was provided in a 2-inch diameter Lucite column having an area of 0.0217 square feet. The column was filled to a depth of 22 inches, providing a resin bed volume of 0.04 cubic feet. The resin was a sulfonate styrene, divinyl benezene copolymer cation exchange resin prepared as described in U.S. 2,366,007. The resin had a total capacity of 1.83 milli-equivalents per milliliter, a water-holding capacity of 53.8%, and a swelling value in the sodium form to the hydrogen form of 6.5%. The feed silicate solution was refrigerated and the resin bed precooled by passing refrigerated water. The temperature of the silicate solution and resin bed was 45° F. The feed solution was passed through the resin bed down flow at a rate of11 gallons per minute per square foot of bed cross-sectional area. The temperature of the acid silica sol effluent rose to a peak temperature of 73° F. The water initially present in the bed was displaced by the feed solution and was discarded, after which the acid silica sol effluent was collected until a minimum conductivity was reached following the first drop in conductivity of the effluent. The bed then was rinsed with water to remove the silicate remaining therein.

The acid sol produced by the foregoing manner had a specific gravity of 1.060, corresponding to a silica content of 9.8%. This represents a drop in concentration of about 0.1% due to water formation and resin shrinkage with release of water, and about a 0.1% drop due to gel formation. The resin bed was clean and free-flowing and was thus capable of reuse for producing further acidic silica sol for use in the practices of the invention.

When it is desired to produce somewhat less concentrated solutions of starting acidic colloidal silica sols which are then processed by the steps previously described, the teachings of Reuter Canadian Patent 623,562 may be used. In this process alkali metal silicate feed solutions containing 7-15% silica are passed through a bed of strong acid cation exchange resin in the hydrogen form to produce concentrated sols. The feed solutions are passed through the exchange resin at rates of 3-7 gallons per minute per square foot of resin area, and in certain cases higher flow rates may be used. The advantage of this technique is that it may be conducted at standard operating temperatures and no refrigeration is required.

Acidic sols of the type described are then further processed in accordance with the invention by adding thereto a water-soluble alkali metal or an ammonium base. Illustrative of such materials are the alkali metal hydroxides, e.g. sodium, potassium, lithium, cesium, or ammonium bases such as ammonium hydroxide, quaternary ammonium hydroxides and the like. Also useful are other bases such as the alkali metal carbonates or bicarbonates. Another suitable source of alkali metal is sodium or potassium silicate. From a standpoint of convenience and commercial availability, sodium silicate or sodium hydroxide represent the preferred source of alkali metal.

The starting alkaline sols, when alkalized to provide the $SiO_2/Na_2O$ ratio described will usually have a pH within the range of 8-10 based on a 7-10% by weight $SiO_2$ sol.

The present invention is concerned with producing a concentrated silica sol having particle diameters between 2 and 5 millimicrons with $SiO_2$ concentrations of 10 to 25% by weight. Concentrated solutions within this particle size range have not previously been prepared. The present invention concentrates the small particle size starting sols without any substantial increase in particle size occurring. This is a most surprising phenomena. The prior art practices show that particle size increases due to growth when silica sol solutions are concentrated. This is particularly true when the particle size of the starting sols is less than 5 millimicrons in diameter.

The above is illustrated by the practices of Reuter et al., U.S. 2,929,790. This patent teaches a method for concentrating an alkalized silica sol by evaporating the alkaline silica sol and concurrently adding acidic cation exchange effluent silica sol thereto during the evaporation. By this method Reuter et al. is able to concentrate the initial silica sol to a value of 48% by weight. Reuter et al. is concerned primarily with producing a silica sol having a relatively high concentration of silica. No attention was given to controlling the particle size of the silica.

The method of concentrating silica sols as taught by Reuter et al. is illustrated by Example II below.

Example II 2 liters of acid sol produced as described in Bird U.S. Pat. 2,244,325 were adjusted to a pH of 8.60 using the same commercial sodium silica as was used in the production of the acid sol. 1350 millimeters of this alkalized sol with a $SiO_2$ content of 4.4% were charged to a two liter flask and evaporated at atmospheric pressure to 475 ml. This heel contained 12.6% $SiO_2$ at a pH of 10.3. 425 ml. of this heel was then charged to a reaction flask and brought to a boil while stirring vigorously. Addition of acid sol, containing 3.9% $SiO_2$ at a pH of 2.85 was started. During the addition of the remainder of the sol, constant volume was maintained. 2400 ml. of feed were added during 10¼ hours at which point the sol contained 35.5% $SiO_2$. The finished sol had a pH of 9.02 and had a viscosity of 5.2 cps. The sol was turbid but not cloudy with a turbidity index of 0.058 cm.$^{-1}$ at 10% $SiO_2$.

Physical data from the samples collected during this run is presented below in Table 1.

TABLE 1

| Feed in, ml. | Time, hours | pH | Concentration, grams SiO₂ Percent SiO₂ | Concentration, grams SiO₂ milliliter | D, m$\mu$ |
|---|---|---|---|---|---|
| 0 (heel) | 0 | 10.34 | 12.6 | .136 | 6.2 |
| 300 | 1¼ | 10.11 | 15.5 | .170 | 6.6 |
| 450 | 2 | 10.00 | 16.4 | .181 | 6.7 |
| 1,000 | 4¼ | 9.68 | 22.0 | .251 | 7.9 |
| 1,500 | 6¼ | 9.40 | 27.0 | .319 | 8.9 |
| 2,000 | 8¼ | 9.20 | 31.8 | .384 | 9.6 |
| 2,400 | 10¼ | 9.02 | 35.5 | .445 | 10.9 |

In view of Table 1 above, it can be seen that the resulting particle diameters of the silica increase with increase in $SiO_2$ concentration.

The only art in silica sol technology that is related to the control of particle size in the area of small particle size sols is Alexander, U.S. 2,750,345. This patent discloses that by certain manipulative steps it is possible to produce silica sols whose average particle size does not exceed 5 to 8 millimicrons.

The sols of the Alexander patent are prepared by processes in which metal cations are removed from an alkali metal silica solution by an ion exchange to form a dilute acidic silica sol. The silica sol of the Alexander patent is then alkalized to an $SiO_2$: alkali oxide molar ratio of from 30:1 to 150:1. The alkali sol is then heated to a temperature of from 50 to 125° C. whereby the ultimate silica particles are grown to a size corresponding to a surface area of from 350 to 600 sq. meters per gram. The sol is then brought into contact with a cation and an anion exchanger to remove substantially all salts therefrom. The deionized sol is alkalized to $SiO_2$: alkali oxide molar ratio of from 20 to 1 to 300:1. The sol is concentrated to at least 15% $SiO_2$ by removing water.

The Alexander patent as the Reuter et al. patent teaches a method whereby silica sols are concentrated with accompanying particle growth. The difference between Alexander patent and Reuter et al patent is that Alexander controls his particle size diameters to the range of 5 to 8 millimicrons. It should be noted that the Alexander silica sol product after the concentrating steps would be unstable unless subsequently treated by the deionization techniques to remove all anions and cations.

The present invention on the other hand is very different from either Reuter et al. or Alexander. The present invention concerns the concentration of silica sol having small particle diameters without substantial particle growth. Furthermore, the resulting product taught by this invention is stable even in the presence of salts and therefore subsequent deionization steps are not necessary. An alkaline sol to be stable in the presence of added salts is indeed contrary to the common belief of the art. Iler, in "The Colloidal Chemistry of Silica and Silicates," on page 108, states, "In acid solution, colloidal silica is relatively insensitive to the presence of added salts, but above about pH 4 or 5, the sol becomes increasingly unstable and gels more rapidly as electrolyte is added."

Employing the teachings of this invention, one is able to concentrate small particle diameter colloidal silica sols without substantial growth and obtain a concentrated product which is alkaline and yet stable. The unique characteristics of the concentrated small particle diameter silica sol of this invention are attributed to the low temperatures of evaporation resulting from evaporating the system under vacuum and the relatively high alkali metal content.

The following examples are given to illustrate the operative techniques in obtaining the unique silica sols taught by this invention.

Example III 1,000 milliliters of an alkalized silica sol containing about 8% $SiO_2$ and adjusted to a pH of 8.7 with sodium silicate. This produced an $SiO_2/NaO_2$ ratio of 33/1. This sol was added to 1250 milliliters of the same type sol and was vacuum boiled at 150° F. The addition of the alkaline sol to the boiling sol contained in the vessel was added over a 3-hour period, with the volume in the vessel being maintained constant at 1,000 milliliters. At the end of 3 hours, the boiling was stopped, the vacuum released. The final product had a silica concentration of 17.5%, the average particle size diameter being 3.9 millimicrons. The finished product also had a pH of 10.2 and a conductance of 4500 micromhos. Accelerated storage stability studies on this product showed it to be stable for several months.

Example IV

Using the same technique as described above, to 1,000 milliliters of an alkali sol having a silica concentration of 7% $SiO_2$, a pH of 9.0 and a $SiO_2/NaO_2$ ratio of 27/1 furnished by sodium silicate was added 1,600 milliliters of the same alkaline sol over a 3 hour period with the temperature being kept by means of a vacuum at 95° F. Volume was maintained constant by incremental addition of the alkaline sol at 1,000 milliliters. At the end of the 3 hour period, the finished product was removed and was found to contain a silica concentration of 16.2% with a particle diameter of 3.2 millimicrons, a pH of 9 and a conductance of 6,200 micromhos. The sol was slightly viscous but at the end of one month's accelerated storage tests, no instability characteristics were noted.

Example V 1,000 milliliters of acidic silica sol produced in accordance with the procedure set out in Example I was alakalized to a pH level of 10.2 through the addition of 76 grams of sodium silicate. The $SiO_2$ content was 6.1% by weight. The ratio of $SiO_2/Na_2O$ was 12.8. This alkalized sol was added to a 2-liter reaction flask. The alkalized sol was then boiled under a vacuum of 23" of mercury at a temperature of 145–150° F. for 2 hours and 40 minutes. During this time 1,037 milliliters of an acidic sol produced in accordance with the procedure given in Example I having a pH of 3.0 and an $SiO_2$ content of 6.1% was added thereto such that the volume in the vessel was maintained at a constant 1,000 milliliters. At the end of the 2 hr. 40 minute time period (after completion of the acid sol), the boiling was stopped and the vacuum released. The final product had a silica concentration of 15.1% $SiO_2$, the average particle size diameter being 4.3 millimicrons. The finished product also had a pH of 10.2 and a conductance of 4,700 micromhos. The specific gravity of the final product was 1.1025 cps. The final $SiO_2/Na_2O$ ratio was 26. This sol was found to have a stability for 4 months at a temperature of 140° F. Extrapolated to room temperature, the same sol was found to have an estimated stability of 4 to 7 years.

CONCLUSION

The finished sols of the invention are water white in appearance. They are novel in that they are extremely concentrated, e.g. greater than 15% by weight $SiO_2$, yet at the same time they have particle sizes less than 5 millimicrons. By controlling the temperature of the evaporation step it is possible to prevent particle growth yet at the same time allow a relatively concentrated product to be produced.

Having thus described my invention, it is claimed as follows:

1. A method of producing an aqueous colloidal silica sol having the following characteristics:

Average particle size diameter - 2 but less than 5 m$\mu$.
Percent silica, as $SiO_2$ _____ 10 to 25%.
pH _____ 9 to 11.
$SiO_2/Na_2O$ _____ >15.

which comprises the steps of:
(A) treating an acidic aqueous colloidal silica sol having an $SiO_2$ concentration of from 5 to 10% by weight and a particle size diameter of less than 5 millimicrons with a water-soluble alkali metal or ammonium base to furnish an $SiO_2/Na_2O$ ratio of at least 15 to provide an alkaline sol;
(B) heating a portion of said alkaline sol under evaporation conditions to a temperature not greater than 150° F.;
(C) maintaining the evaporation of said alkaline sol at a constant volume by the addition of unheated alkaline sol; and
(D) continuing said evaporation until the silica concentration is within the range of 10 to 25% by weight.

2. A method of producing an aqueous colloidal silica sol having the following characteristics:

Average particle size diameter, m$\mu$ _____ 3 to 4.5
Percent silica, as $SiO_2$ _____ 15 to 25%
pH _____ 9.5 to 10.5
$SiO_2/Na_2O$ _____ 25 to 35 which comprises the steps of:
(A) treating an acidic aqueous colloidal silica sol having an $SiO_2$ concentration of from 5 to 10% by weight and a particle size diameter of less than 5 millimicrons with a water-soluble alkali metal or ammonium base to furnish an $SiO_2/Na_2O$ ratio of from 20 to 35 to provide an alkaline sol;
(B) heating a portion of said alkaline sol under evaporating conditions to a temperature within the range of 100 to 150° F.;
(C) maintaining the evaporation of said alkaline sol at a constant volume by the addition of unheated alkaline sol; and
(D) continuing said evaporation until the silica coning an $SiO_2$ concentration of from 5 to 10% by weight.

References Cited
UNITED STATES PATENTS 2,833,724   5/1958   Alexander et al. ___ 252—313 S
2,597,872   5/1952   Iler _____ 252—313 S X RICHARD D. LOVERING, Primary Examiner U.S. Cl. X.R.

106—287 S; 252—8.6

UNITED STATES PATENT OFFICE
CERTIFICATE OF CORRECTION

Patent No. 3,714,064          Dated January 30, 1973

Inventor(s) Peter H. Vossos

It is certified that error appears in the above-identified patent and that said Letters Patent are hereby corrected as shown below:

Column 3, line 50, for "5µ" should read -- 5mµ --.
Column 4, line 13, for "stronge" should read -- strong --.
Column 8, line 17, for "25 to 35" should read -- 20 to 35 --.
Claim 2(D) should read -- continuing said evaporation until the silica concentration is within the range of 15 to 25% by weight. --.

Signed and sealed this 3rd day of July 1973.

(SEAL)
Attest:

EDWARD M. FLETCHER, JR.          Rene Tegtmeyer
Attesting Officer                 Acting Commissioner of Patents